Oct. 6, 1953 A. P. KRUEGER 2,654,154
TAPE MEASURING DISPENSER
Filed Jan. 19, 1949 2 Sheets-Sheet 1

Inventor
Alfred P. Krueger
By
Rockwell & Bartholow
ATTORNEYS

Inventor
Alfred P. Krueger
By
Rockwell Bartholow
ATTORNEYS

Patented Oct. 6, 1953

2,654,154

UNITED STATES PATENT OFFICE 2,654,154

TAPE MEASURING DISPENSER

Alfred P. Krueger, Stratford, Conn., assignor to Derby Sealers, Incorporated, Derby, Conn., a corporation of Connecticut Application January 19, 1949, Serial No. 71,574

6 Claims. (Cl. 33—131)

This invention relates to tape-dispensing machines and, more particularly, to a device for dispensing pressure-sensitive tape which is tacky or clingable upon one surface.

In using pressure-sensitive tape, it is often desirable to be able to draw the tape from the supply roll in measured lengths, as certain uses of such tape require predetermined lengths of strip, so that sufficient tape will be had to meet the requirements, and no more. It is, therefore, desirable to employ a tape-dispensing device which will deliver predetermined lengths of tape, which lengths will be measured with reasonable accuracy so as to be uniform.

Moreover, as the uses of this character of tape vary, the desired length of the tape strip will also vary and, in providing a machine which will deliver a measured length of strip, it is also desirable, in order that the device be capable of universal use, that it also be capable of adjustment so that, within limits, any desired length of strip may be secured.

Owing to the tacky or clingable characteristic of one surface of the tape, the provision of a practical and commercial device for dispensing it has presented a considerable problem. In the present instance, the dispenser may be termed one of the "pull" type in that the tape is drawn from the supply roll by a pull upon its free end. The tape is drawn over what may be termed a feed roll, and the tacky nature of the tape is, in this instance, employed to rotate the roll, so that the measurement of the dispensed strip can be effected by limiting the rotation of this roll with which the tacky side of the tape is engaged.

As the limitation of the movement of the feed roll in a forward or tape-feeding direction is effected by means of a stop, provision is made for the reverse rotation of the roll, in order to position the measuring means for a subsequent operation. In the present instance, the feed roll is permitted to rotate in a reverse direction between feeding operations, and it will be apparent that such reverse rotation must be effected when the tape is disengaged from the roll for, if the tape engaged the roll during its reverse rotation, it would, of course, be carried in a reverse direction and a free end of the tape would then not be accessible to be grasped by the operator.

To this end, a severing mechanism is provided in a position which is spaced from the feed roll, so that the tape must be drawn away from the roll to be drawn against the severing blade. The severing operation, therefore, requires that the tape be drawn away from the roll and, immediately upon the disengagement of the tape from the roll, the latter is rotated in a reverse direction to an initial or starting position. Means are provided to thereafter strip the unsevered end of the tape from the severing member and cause it to impinge again against the roll, in order that a free end will project from the machine to be grasped by the operator. It will be understood, however, that this reengagement of the tape with the feed roll takes place after the reverse rotation of the latter, since this reverse rotation takes place between the time that the tape is drawn from the roll and the time at which it is returned to the roll after the dispensed strip is severed.

One object of the present invention is to provide a new and improved device for dispensing pressure-sensitive tape.

A further object of the invention is to provide a simple mechanism for dispensing pressure-sensitive tape such that accurately measured strips of predetermined lengths may be drawn from the supply roll.

Still another object of the invention is to provide a mechanism for dispensing measured lengths of pressure-sensitive tape, the tape being drawn from the supply roll over a feed roller, the surface of which is engaged by the tacky side of the tape, and the dispensed strips measured by rotation of this feed roller, the device being provided with means to limit the forward and reverse rotation of the roller.

To these and other ends the invention consists in the novel features and combinations of parts to be hereinafter described and claimed.

Figure 3:
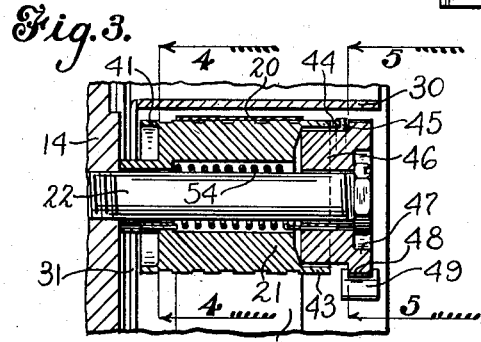
Fig. 3 is a sectional view on line 3—3 of Fig. 1.
Figure 4:
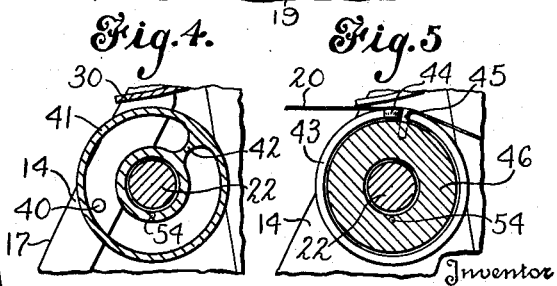
Figure 5:
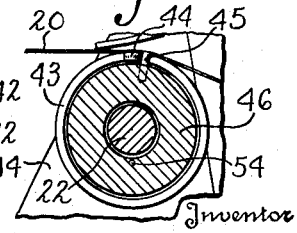
Figure 6:
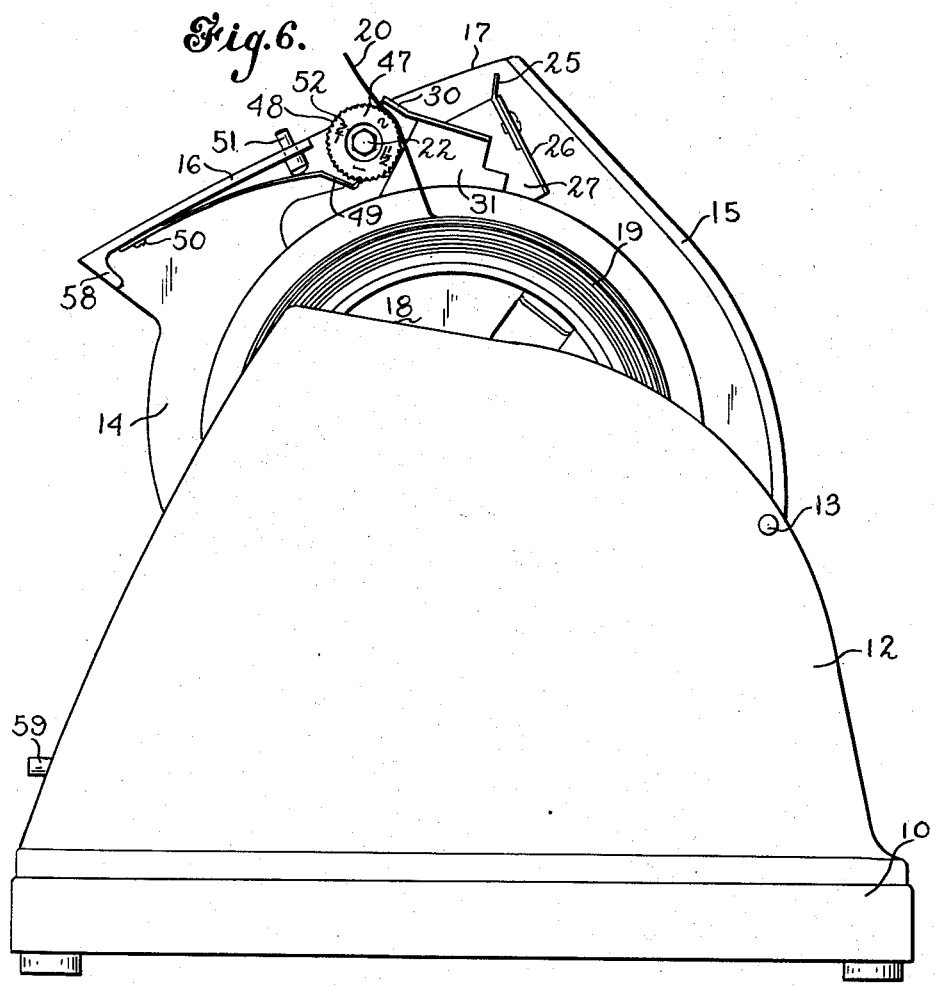
Figure 7:
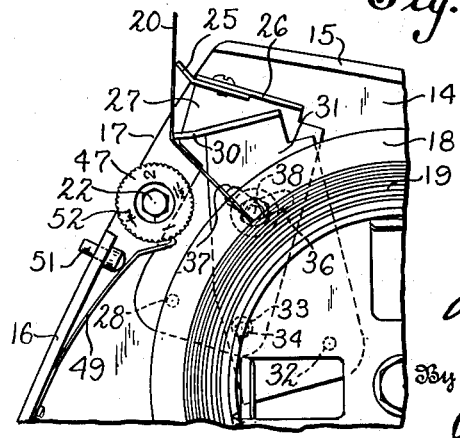

Figs. 4 and 5 are sectional views through the feed roller on lines 4—4 and 5—5 of Fig. 3;

Fig. 6 is a side elevational view of the device showing the auxiliary frame swung to open position; and Fig. 7 is a fragmentary elevational view showing the parts in position occupied when a length of tape is being severed.

To illustrate a preferred embodiment of my invention, I have shown a tape-dispensing mechanism comprising a base or support 10 provided with a pair of spaced upstanding walls 11 and 12. Between these upstanding walls, an auxiliary frame is disposed, this frame being pivoted at 13 to the walls 11 and 12 so that it may swing from the closed position shown in Fig. 1 to the open position shown in Fig. 6, it being understood that this swinging movement may be continued beyond the position shown in Fig. 6 in order that a new supply roll of tape may be placed in the machine.

The auxiliary frame comprises a main plate or wall 14 having an upper laterally extending flange 15 through which the pivot pin 13 extends, and a forward flange 16 normally disposed at the front of the machine, there being an opening 17 between the adjacent ends of these flanges through which the tape passes. Upon the wall 14 is mounted a holder or reel 18 for the supply roll of tape 19. The free end of the tape is shown at 20 and, as illustrated, this tape passes over a feed roller 21 rotatably mounted upon a stud 22 secured to the plate 14, as shown more especially in Fig. 3. It will be understood that the tacky side of the tape engages the surface of the feed roll 21 so that the roller is rotated as the tape is drawn thereover. A surface of the roller may be knurled, as shown, to provide the proper amount of adherence between the tape and the roller.

Figure 1:
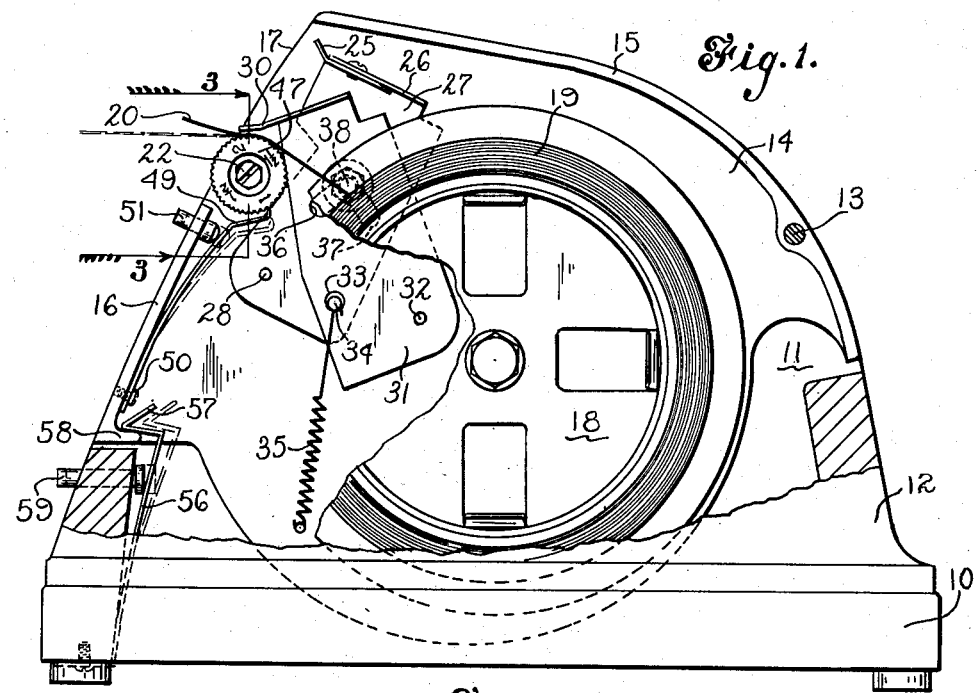
Fig. 1 is a side elevational view of a tape-dispensing machine embodying my invention, the near wall of the casing being broken away to show the interior mechanism.
Figure 2:
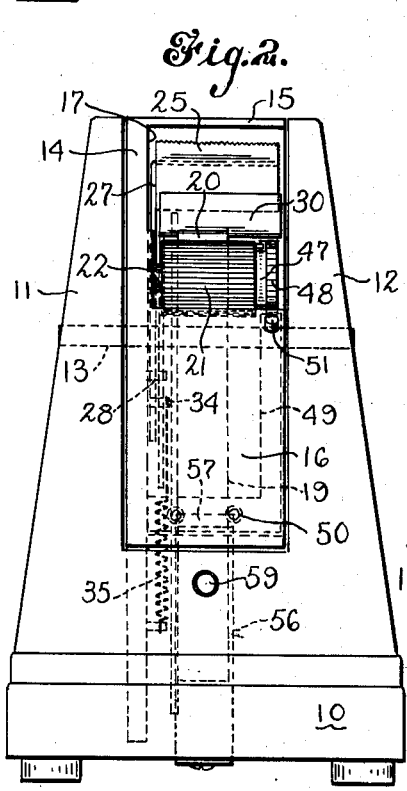
Fig. 2 is a front elevational view of the device.

A severing member 25 is carried by a laterally extending flange 26 of a plate 27 which is pivoted at 28 to the wall 14 of the auxiliary frame, this severing member extending across the path of the tape, as shown in Fig. 2, and, owing to the pivotal connection 28, it may be moved from a retracted position within the frame, shown in Fig. 1, to an exposed position shown in Fig. 7, where it may readily be engaged by the tape for the severing operation.

A stripper member 30 is secured to, and extends laterally from, a plate 31 pivoted to the member 14 at 32, this plate having an opening 33 to loosely receive a pin 34 secured to the plate 27 so that movement of one of these plates will effect movement of the other. A spring 35, secured at one end to the pin 34 and at the other end to the member 14, normally holds the plates 27 and 31 in the position shown in Fig. 1, the movement of the plates in the direction in which they are urged by the spring being limited by slots 36 and 37 in the plates and a pin 38 secured to the member 14 and received in these slots. The stripper member 30 is substantially co-extensive in width with the severing member 25, and the forward end of the stripper member, as shown in Fig. 1, normally lies in a position close to the non-tacky side of the tape when it is adhered to the feed roller 21, the function of the stripper being to strip the tape from the severing member and return it into engagement with the feed roller, although the stripper member is not necessarily in contact with the non-tacky side of the tape when the latter is in engagement with the feed roller.

In order that measured lengths of tape may be dispensed from the machine, means are provided for limiting the forward and reverse rotation of the feed roll 21, one of these limiting means being adjustable so that the machine may be set to deliver different lengths of strip, if desired. It will be seen that as the tape adheres to the roller 21 when being dispensed, the length of the strip will be determined by the amount of rotation permitted this roller.

As shown in Fig. 4 for example, the forward movement of the feed roller is limited by a stop pin 40 secured to the plate 14, the pin projecting within a flange 41 at the adjacent end of the feed roller, and this flange being provided with a web 42 adapted to engage the pin 40 upon a forward rotation of the roll.

The reverse rotation of the roll is limited by means at the opposite end thereof, at which end the roller is provided with a cylindrical flange 43 from which extends laterally a lug or finger 44. This lug 44 is designed to be engaged by a stop pin 45 carried by a disk 46 rotatably mounted on the shaft 22 of the roller. This disk 46 is provided with a flange 47 having a serrated edge 48 which is adapted to be engaged by the free end of a spring detent 49 (Fig. 1), this detent being secured at 50 to the flange 16.

It will be seen that the engagement of this detent will hold the disk 46 in a predetermined position, and the detent may be disengaged from the serrations 48 by means of the push button 51 movably mounted in the flange 16, the inner end of the push button being engaged with the detent 49. Upon disengaging this detent from the serrations 48, the operator, by rotating the flange 47, may move the stop pin 45 to any desired position to limit reverse rotation of the roll and thus may set the machine to deliver a predetermined length of tape from the machine, which lengths may, of course, be varied by adjustment of the disk. As shown in Fig. 6, the face of the flange 47 is provided with indicia 52 which will indicate to the user the length of strip for which the machine is set. As shown the machine is set to deliver a strip one inch long, the end of the detent 49 engaging the flange 47 being opposite the numeral "1" upon this flange.

As the feed roller rotates between the forward stop 40 and the rear adjustable stop 45, and as it is drawn against the forward stop as the tape is fed, means is provided to return the roller to its initial position against the rear stop 45. To this end a spring 54 surrounds the stud 22, one end of this spring being secured to the roller 21 and the other end being secured to the disk 46, the spring being so tensioned as to urge the roller in a reverse direction and maintain the ear or finger 44 against the stop pin 45, as shown in Fig. 5.

It will be obvious that, when the user draws the tape forwardly to dispense a length of tape from the machine, the forward motion of the roller will be checked by engagement of the web 42 against the stop pin 40. As long as the operator holds the tape taut the spring 54 cannot return the roller to its initial position due to the fact that the clingy side of the tape adheres to this roller. The severing member 25 is so positioned that the tape must be disengaged from the roller, as shown in Fig. 7, for a severing operation, and as soon as the tape is disengaged from the roller by a movement toward the severing member, the spring 54 will then return the roller to its initial position in which the member 44 lies against the pin 45, so that this roller is ready for a subsequent operation.

The position of the parts when the device is at rest is shown at Fig. 1, and the operator may, by grasping the protruding end 20 of the tape, draw a length of tape from the machine in contact with the roller 21, this length being measured by the amount of rotation permitted the roller by the stops 40 and 45. When resistance to pull upon the tape indicates that the web 42 is in engagement with the stop pin 40, the desired length of tape will have been dispensed, and the user then moves the tape toward the severing member 25. The non-tacky side of the tape engages the stripper 30, and moves this member about its pivot 32 from the position shown in Fig. 1 to the position shown in Fig. 7. This causes the plate 27 to be moved about its pivot 28, thus moving the severing member 25 from a retracted or guarded position, shown in Fig. 1, to an exposed position, shown in Fig. 7, where the tape may be readily engaged therewith to be severed.

When the tape is disengaged from the roller in this movement, the latter will be returned to its initial position by the spring 54 and, as soon as the tape has been severed against the edge of the severing member 25, the stripper will no longer be held in the position shown in Fig. 7 by tension on the tape, and the spring 35 will return the stripper and severing member to their original positions shown in Fig. 1. The stripper, engaging the non-tacky side of the tape, will return the unsevered end of the tape into engagement with the feed roller 21, leaving a free end 20 projecting from the roller to be grasped by the user.

It will be noted that the parts of the device will be effectively concealed within the housing constituted by the walls 11 and 12, and the auxiliary frame member 14 with its flanges 15 and 16. In order to adjust the position of the disk 46, and in order to load the machine with a new supply roll of tape, the auxiliary frame may be swung to an open position about its pivot 13 so that the interior mechanism will be completely exposed. In order to secure the auxiliary frame in position, a spring latch 56 is secured at its lower end to the base 10 and provided at its upper free end with a hook 57 which engages over a lip 58 secured to the flange 16 of the auxiliary frame. The hook 57 may be disengaged from the lip 58 by a push pin 59 movably mounted at the front of the base 10.

While I have shown and described a preferred embodiment of my invention, it will be understood that it is not to be limited to all of the details shown, but is capable of modification and variation within the spirit of the invention and within the scope of the claims.

What I claim is:

1. A machine for dispensing pressure-sensitive tape comprising a frame, means thereon for supporting a supply roll of tape, a roller rotatably mounted on the frame to which the tacky side of the tape adheres as it comes from the supply roll, said roller being rotated in a forward direction when the tape is drawn thereover, a severing member spaced from the roller on the non-tacky side of the tape and transversely of the path of the tape whereby the tape must be disengaged from the roller when moved against the severing member, means for rotating said roller in a reverse direction when the tape is disengaged therefrom by movement toward the severing member, a stop on the frame engageable with a part of the roller, a disk rotatably mounted coaxially with the roller and provided with a stop engageable with a part of the roller, means for adjusting one of said stops to variably limit movement of the roller, and a stripper member to strip the tape from the severing means and move it toward the roller.

2. A machine for dispensing pressure-sensitive tape comprising a frame, means thereon for supporting a supply roll of tape, a roller rotatably mounted on the frame to which the tacky side of the tape adheres as it comes from the supply roll, said roller being rotated in a forward direction when the tape is drawn thereover, a severing member spaced from the roller on the non-tacky side of the tape and transversely of the path of the tape whereby the tape must be disengaged from the roller when moved against the severing member, means for rotating said roller in a reverse direction when the tape is disengaged therefrom by movement toward the severing member, a stop on the frame engageable with a part of the roller to limit movement of the latter in one direction, a disk rotatably mounted coaxially with the roller and provided with a stop engageable with a part of the roller to limit the movement thereof in the opposite direction, and means holding said disk in adjusted positions with respect to the frame.

3. A machine for dispensing pressure-sensitive tape comprising a frame, means thereon for supporting a supply roll of tape, a roller rotatably mounted on the frame to which the tacky side of the tape adheres as it comes from the supply roll, said roller being rotated in a forward direction when the tape is drawn thereover, a severing member spaced from the roller on the non-tacky side of the tape and transversely of the path of the tape whereby the tape must be disengaged from the roller when moved against the severing member, means for rotating said roller in a reverse direction when the tape is disengaged therefrom by movement toward the severing member, a stop on the frame engageable with a part of the roller to limit movement of the latter in one direction, a disk rotatably mounted coaxially with the roller and provided with a stop engageable with a part of the roller to limit the movement thereof in the opposite direction, and means holding said disk in adjusted positions with respect to the frame, said means comprising a spring detent mounted on the frame engaging said disk.

4. A machine for dispensing pressure-sensitive tape comprising a frame, means thereon for supporting a supply roll of tape, a roller rotatably mounted on the frame to which the tacky side of the tape adheres as it comes from the supply roll, said roller being rotated in a forward direction when the tape is drawn thereover, a severing member spaced from the roller on the non-tacky side of the tape and transversely of the path of the tape whereby the tape must be disengaged from the roller when moved against the severing member, means for rotating said roller in a reverse direction when the tape is disengaged therefrom by movement toward the severing member, a stop on the frame engageable with a part of the roller to limit movement of the latter in one direction, a disk rotatably mounted coaxially with the roller and provided with a stop engageable with a part of the roller to limit the movement thereof in the opposite direction, and means holding said disk in adjusted positions with respect to the frame, said means comprising a spring detent mounted on the frame and the periphery of said disk having serrations thereon engaged by said detent.

5. A machine for dispensing pressure-sensitive tape comprising a frame, means thereon for supporting a supply roll of tape, a roller rotatably mounted on the frame to which the tacky side of the tape adheres as it comes from the supply roll, said roller being rotated in a forward direction when the tape is drawn thereover, a severing member spaced from the roller on the non-tacky side of the tape and transversely of the path of the tape whereby the tape must be disengaged from the roller when moved against the severing member, spring means for rotating said roller in a reverse direction when the tape is disengaged therefrom by movement toward the severing member, a stop on the frame engageable with a part of the roller to limit movement of the latter in one direction, a disk rotatably mounted coaxially with the roller and provided with a stop engageable with a part of the roller to limit the movement thereof in the opposite direction, and means holding said disk in adjusted positions with respect to the frame.

6. A machine for dispensing pressure-sensitive tape comprising a frame, means thereon for supporting a supply roll of tape, a roller rotatably mounted on the frame to which the tacky side of the tape adheres as it comes from the supply roll, said roller being rotated in a forward direction when the tape is drawn thereover, a severing member spaced from the roller on the non-tacky side of the tape and transversely of the path of the tape whereby the tape must be disengaged from the roller when moved against the severing member, means for rotating said roller in a reverse direction when the tape is disengaged therefrom by movement toward the severing member, a stop on the frame engageable with a part of the roller to limit movement of the latter in one direction, a disk rotatably mounted coaxially with the roller and provided with a stop engageable with a part of the roller to limit the movement thereof in the opposite direction, means holding said disk in adjusted positions with respect to the frame, said means comprising a spring detent mounted on the frame and the periphery of said disk having serrations thereon engaged by said detent, and a manually engageable member to release said detent from the disk.

ALFRED P. KRUEGER.

References Cited in the file of this patent

UNITED STATES PATENTS

| Number | Name | Date |
| --- | --- | --- |
| 2,146,038 | West | Feb. 7, 1939 |
| 2,294,670 | Krueger | Sept. 1, 1942 |
| 2,305,592 | Anderson | Dec. 22, 1942 |
| 2,324,349 | Atkins | July 13, 1943 |
| 2,404,317 | Salfisberg | July 16, 1946 |
| 2,407,300 | Smith | Sept. 10, 1946 |
| 2,424,488 | Morin | July 22, 1947 |
| 2,447,145 | Van Cleef | Aug. 17, 1948 |
| 2,547,583 | Krueger | Apr. 3, 1951 |